US008464046B1

(12) United States Patent
Kragh

(10) Patent No.: US 8,464,046 B1
(45) Date of Patent: Jun. 11, 2013

(54) EMERGENCY MEDICAL DATA ACCESS SYSTEM AND ASSOCIATED METHODS

(76) Inventor: James F. Kragh, Winter Park, FL (US)

( * ) Notice: Subject to any disclaimer, the term of this patent is extended or adjusted under 35 U.S.C. 154(b) by 207 days.

(21) Appl. No.: 12/792,980

(22) Filed: Jun. 3, 2010

Related U.S. Application Data

(60) Provisional application No. 61/183,600, filed on Jun. 3, 2009.

(51) Int. Cl.
*H04L 29/06* (2006.01)
(52) U.S. Cl.
USPC .................. 713/156; 713/186; 705/3; 705/38
(58) Field of Classification Search
USPC ................................................. 713/156, 186
See application file for complete search history.

(56) References Cited

U.S. PATENT DOCUMENTS

| | | | | |
|---|---|---|---|---|
| 7,742,982 B2* | 6/2010 | Chaudhuri et al. | ............ | 705/38 |
| 2006/0206724 A1* | 9/2006 | Schaufele et al. | ............ | 713/186 |
| 2007/0061169 A1* | 3/2007 | Lorsch | ............................. | 705/3 |
| 2007/0075135 A1* | 4/2007 | Dettinger et al. | .......... | 235/382.5 |
| 2008/0109370 A1* | 5/2008 | Moshir et al. | ................... | 705/64 |

OTHER PUBLICATIONS

"Information Aggregation and Group Decisions", Sobel, University of California, San Diego Jan. 17, 2006;Journal of Economic Literature.*

* cited by examiner

*Primary Examiner* — Taghi Arani
*Assistant Examiner* — Jason Lee
(74) *Attorney, Agent, or Firm* — Carl M. Napolitano; GrayRobinson, P.A.

(57) ABSTRACT

A system and method are provided for establishing and administering an online secure data sharing network for use in emergency situations wherein a patient is unconscious or otherwise unable to communicate. The network enables first responders to identify victims and reach next-of-kin, and to provide emergency medical data at the crash scene, the emergency data having previously been authorized for access by the patient. The network includes an emergency medical data registry in which a person can elect to participate, by validating and authenticating their identity and consenting to securely provide emergency medical data on themselves and, if applicable, their children. The emergency medical data can only be viewed by a licensed emergency healthcare worker.

12 Claims, 12 Drawing Sheets

FIG. 6

PVID Privacy Class Matrix

| Privacy Levels / Class Name | Share all Data | Restricted data sharing | Sharing with restricted access | No sharing of data | Emergency Only | Consents | Preferences Authorizations | Directives DNR, organ donation | Opt-in - Opt-out | Medical - Power of Attorney | Privacy Security Access/Class Definitions |
|---|---|---|---|---|---|---|---|---|---|---|---|
| Temporary | | | | | | | | | | | |
| Test | | | | | | | | | | | |
| General | | | | | | | | | | | |
| Psychiatry | | | | | | | | | | | |
| Cancer | | | | | | | | | | | |
| HIV | | | | | | | | | | | |
| Research | | | | | | | | | | | |
| Genetics | | | | | | | | | | | |
| Organ Registry | | | | | | | | | | | |
| Transplant History | | | | | | | | | | | |
| Employer | | | | | | | | | | | |
| HIE Participation | | | | | | | | | | | |
| Authorizations | | | | | | | | | | | |

Emergency Medical Data Set* for

Name: Octivia Helios  
Authenticated*

Gender: Female  EMPI: NA  
Primary HIE/RHIO: Orlando, FL FLCF32802-115

Confidential

Personal Data - Contact Information

DOB: January 22, 1945  
Race/Ethnicity: Hispanic American  
Primary Language: Spanish  
Home Address: 123 Bastile Dr. Apt. 3  
Boston, MA 02102  
Phone number: home 999-999-9999  
  cell: 111 111-1111

Emergency Contact Data:  
Physician contacts:  
Dr. Thomas E. Duitrite - Primary Care  
office # 999-999-9999  
Dr. Julie P. Quantos OBGYN  
office # 999-999-9999  
Family/Friend contacts:  
Hector Helios Husband 111-111-1111  
Juanita Rodrigus Friend 111-111-1111

Dependent family members under 18:  
  Juan Hulios-son 17 - chronic;  
  Sally Helios-daughter - 15 w/disability  
  Billy Ann Helios-son - 9  
  Juanita Helios-daughter - 3

Local ER or Trauma Center:  
Name Santa Clara General Hospital  
Phone# 888-888-8888

Driver License # 7221-449-331AX  
State: Florida  
Vehicles registered in: Georgia  
Vehicle #1 License Plate # 887 AB7A  
VIN # A227 9999 3333 2222 - ACA  
Vehicle #2 License Plate # 257 476B  
VIN # TRC3 7777 9999 8888 1111

Insurance Coverage:  
Blue Cross Blue Shield of California  
Plan Name: Options for Good Blue Health  
Policy# XRGH12131456577  
Group# BA11398  
Contact# 1-877 999-1234

*Individual voluntarily consented to an Opt-in  
Preference to share this Emergency Medical Data generated from their Personal Health Record on 04/25/2009 11:11PM PDT

Emergency Medical Data

BLOOD TYPE: AB+

ALLERGIES: as of 12/03/2009  
Latex - severe  
Sulfa - severe  
Peanuts - mild  
Feline Dander -moderate

PROBLEM LIST as of 3/11/2009  
Hemoptysis,  
Mitral Valve Replacement,  
Congenital Subaortic Membrane,  
Chronic Atrial Fibrillation,  
Diabetes Mellitus Type 2,  
Stroke without residual deficit,  
Congestive Heart Failure, Sciatia

Active MEDICATIONS as of 3/11/2009  
Spironolactone (Aldactone),  
Amoxicillin (Amoxicillin),  
Warfarin (Coumadin),  
Digoxin (Digitek),  
Valsartan (Diovan),  
Ferous gluconate (Ferrous Gluconate),  
GlyBURIDE (GlyBURIDE),  
Furosemide (Lasix),  
Metformin (Metformin Hydrochloride),  
Acetaminophenhydrocodone (Vicodin)

ADVANCE DIRECTIVES as of 4/25/2009  
DNR and Living Will on file at Attorney's office  
Medical Surrogate is named Hector Helios  
Organ donation directive on file at State james amigo  
Digitally signed by james amigo  
DN: cn=james amigo, o=TNT,  
ou=223, email=goto@home, c=US  
Date: 2010.02.01 07:53:17-05'00'

Confidential - Emergency Medical Data and Contact Information - Confidential  
Copyright Good Health Network, Inc. 2009

FIG. 8

EMERGENCY MEDICAL DATA ACCESS SYSTEM AND ASSOCIATED METHODS

CROSS-REFERENCE TO RELATED APPLICATION

This application claims priority to provisional patent application Ser. No. 61/183,600, filed Jun. 3, 2009.

BACKGROUND

1. Technological Field

The present invention relates to secure medical data access systems, and, more particularly, to such medical data access systems that operate under emergency conditions.

2. Related Art

The Health Insurance Portability and Accountability Act of 1996 (HIPAA), and most recently the American Recovery and Reinvestment Act (ARRA) and February 2009 and April rulings by the Federal Trade Commission (FTC) include standard of privacy regarding an individual's right to privacy regarding health care data. Under the provisions of HIPAA, ARRA, and the FTC, health information, with few exceptions, can only be shared with the express permission, advance consent, and authorization of the patient (or the patient's legal guardian, as appropriate), and when compromised, electronic notifications and, in some case, public notification, must be sent, and electronic audits performed.

If a patient is unconscious and has provided advance authorization and consent for a licensed health care provider to securely access and view health-related and protected health information with family, next-of-kin, friends, or others involved in the patient's emergency care if, in his/her judgment, it would be in the best interest of the patient.

In Florida, vehicle owners can securely store emergency contact information electronically, including the name and telephone number of at least one person, and link same to their driver's licenses (DL). A law enforcement officer or first responder, if they can locate a driver's license at an accident scene, can contact the Department of Motor Vehicles to obtain emergency contact (ECON) data. If not available and the vehicle occupants are unconscious or otherwise unable to communicate, notifying the family can be a challenge. ECON information is only available to police at a crash scene in the state of Florida.

NLETS, the National Law Enforcement Telecommunications System, can interface with Department of Motor Vehicle sites across the country and obtain emergency contact information, but only if linked to a vehicle's vehicle identification number (VIN) and with the driver's consent. However, medical data cannot be collected, stored, accessed, or shared via NLETS, which can cause a loss of critical time gaining access to critical healthcare data, such as allergies, blood type, and other medical data, including directives. Such data can save lives or improve the quality of life after a life-threatening event.

Therefore, it would be beneficial to provide a secure system and method for making both VIN and emergency medical data available on an as-needed basis to licensed emergency medical responders, in order that care be provided in a more efficient, safe, and secure fashion if such data can be voluntarily provided and stored in a secure and separate, non-law-enforcement repository, and linked to the NLETS secure infrastructure or a state's trauma or emergency room network.

SUMMARY

A system and method are provided for establishing and administering an online secure data sharing network, in particular, for use in emergency situations wherein a patient is unconscious or otherwise unable to communicate. The network enables first responders to identify victims, reach next-of-kin, reach their medical doctor, and access emergency medical data at a crash scene or other life-threatening event, the emergency data having previously been authorized for access by the patient.

The network includes an emergency medical data registry for each person who elects to participate, by validating, authenticating their identity, and consenting to securely provide emergency medical data on themselves and, if applicable, their children. Such emergency medical data can include, for example, blood type, allergies, current medications, surgeries, and emergency medical contact information, including directives. The emergency medical data can only be presented in a standards-based format and viewed by a licensed healthcare worker, such as an emergency medical technician (EMT) or emergency department staff member. The data are owned by the participant, and can only be modified or deleted by that person. A real-time audit trail is available to the participant, documenting all access events, and a qualified and licensed security professional must be able to access a specific emergency event audit trail for independent auditing purposes without having access to or the ability to view any protected health data.

A system and method for adding participants and licensed professionals to the network is an important feature of the present invention, and will be discussed in detail in the following.

Another registry is established for licensed emergency healthcare providers and institutions, so that their credentials, qualifications, and access privileges can be independently verified real time via a third-party source (policy and procedures) and that such validation will enable them to access the emergency medical data registry at local, regional, or national emergency events. Among the healthcare workers and institutions who may enroll are EMTs, physicians, nurses, hospitals, trauma centers, and EVACs, although these are not intended as limitations.

BRIEF DESCRIPTION OF THE DRAWINGS

FIG. 6 is an exemplary privacy class matrix.

FIG. 8 is an exemplary emergency medical data set of the present invention digitally signed by someone with access to the entire record.

DETAILED DESCRIPTION

Figure 1:
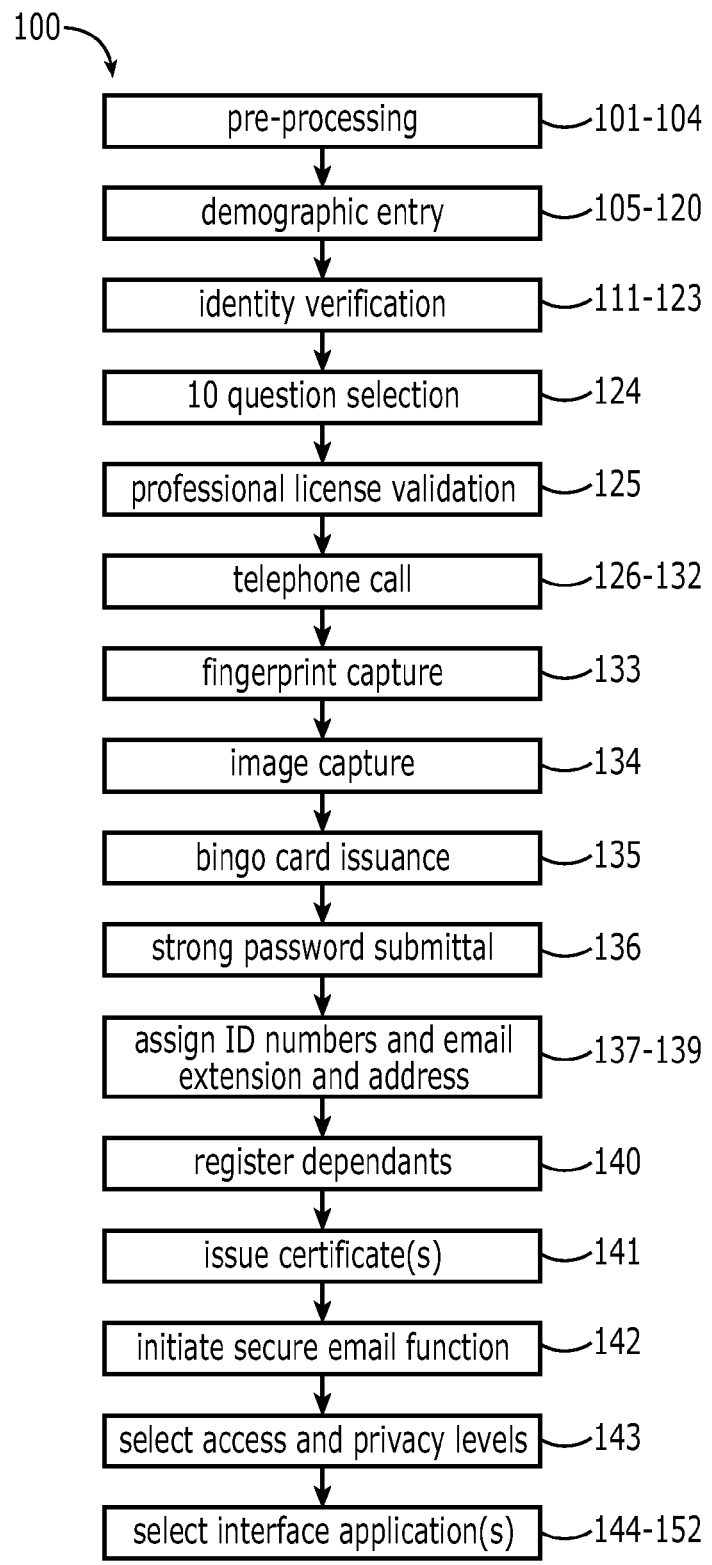
FIG. 1 is an overview flowchart of the process of the present invention for identity verification and consent management.
Figure 2A:
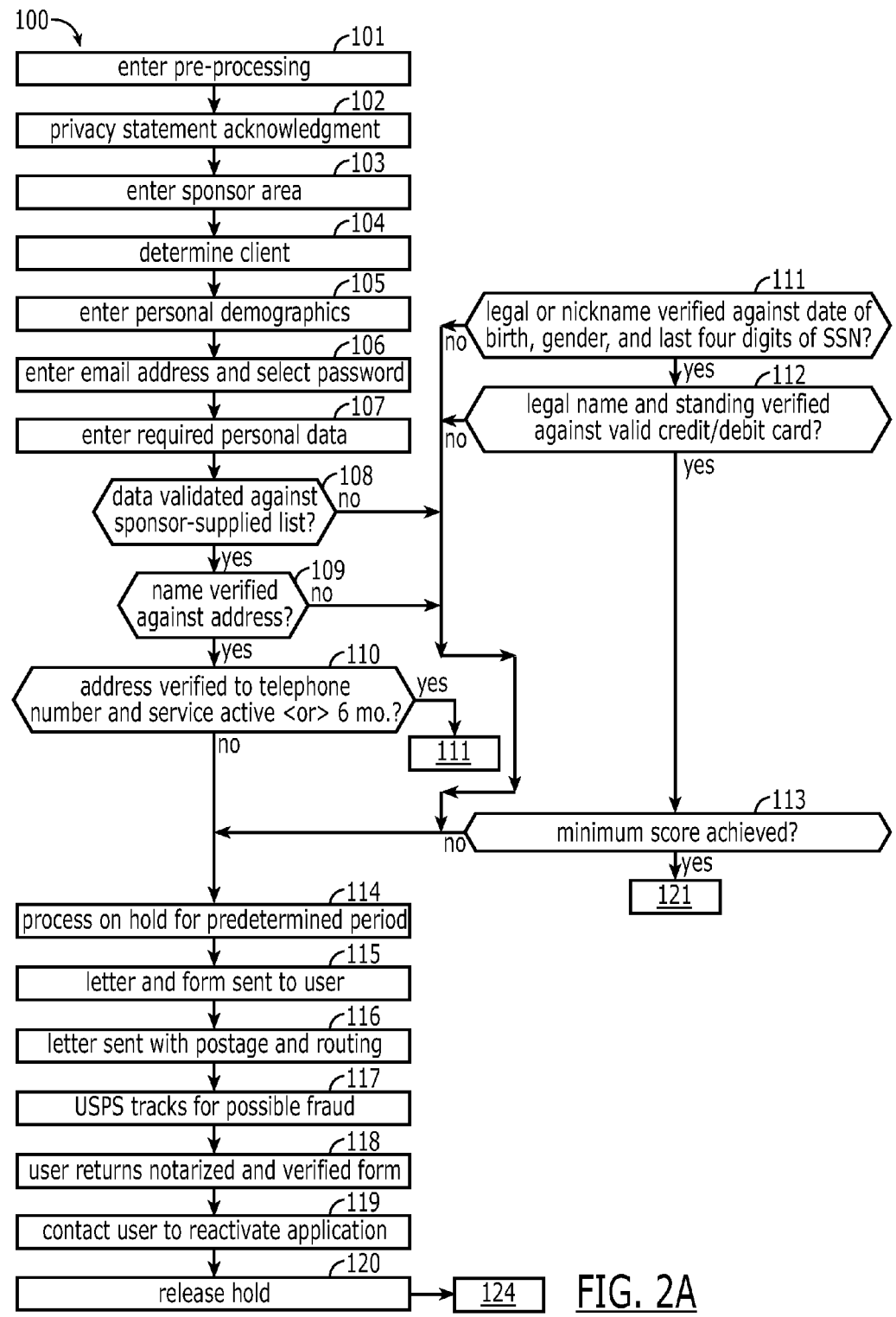
FIGS. 2A-2C is a more detailed flowchart for the process and consent management system of FIG. 1.
Figure 2B:
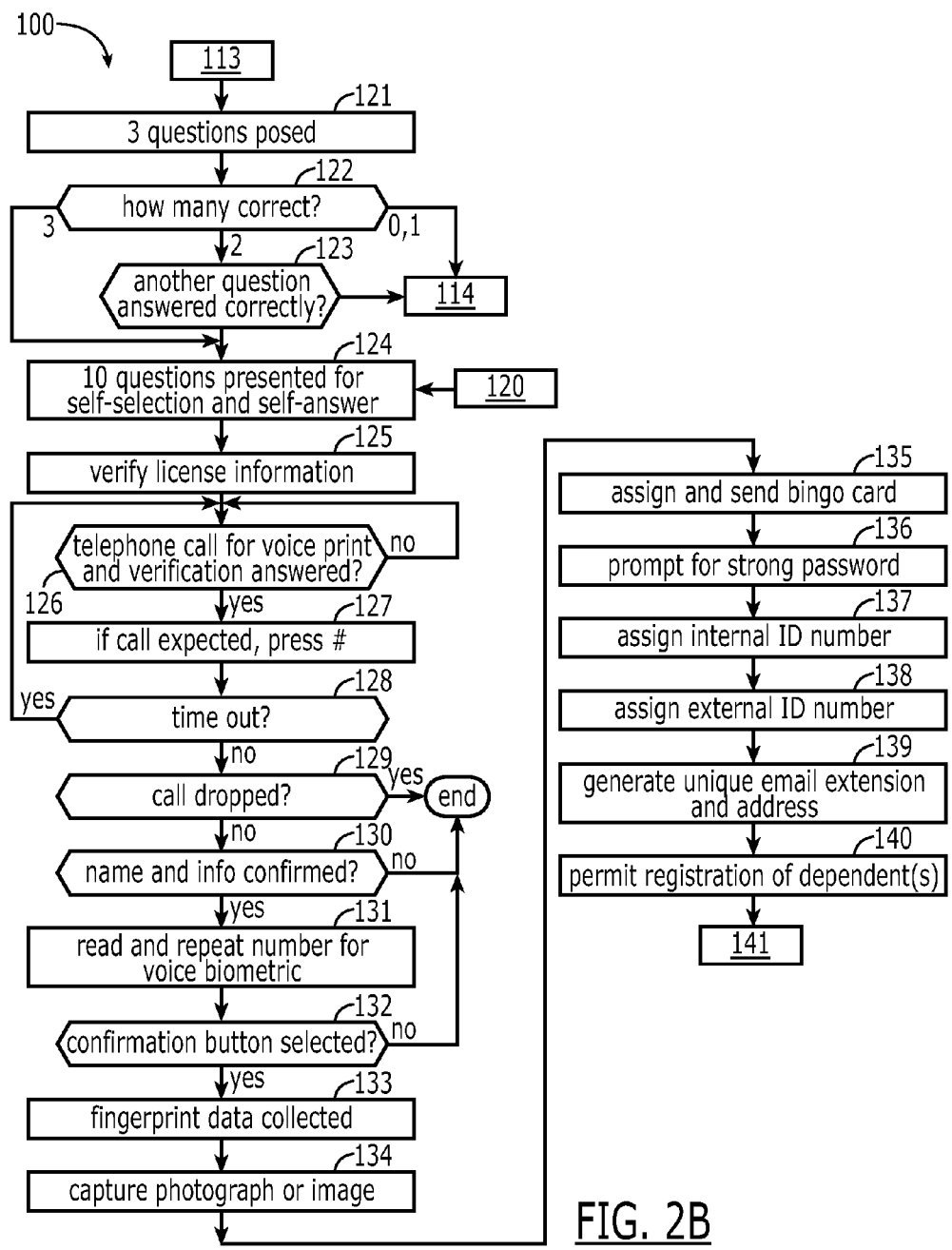
Figure 2C:
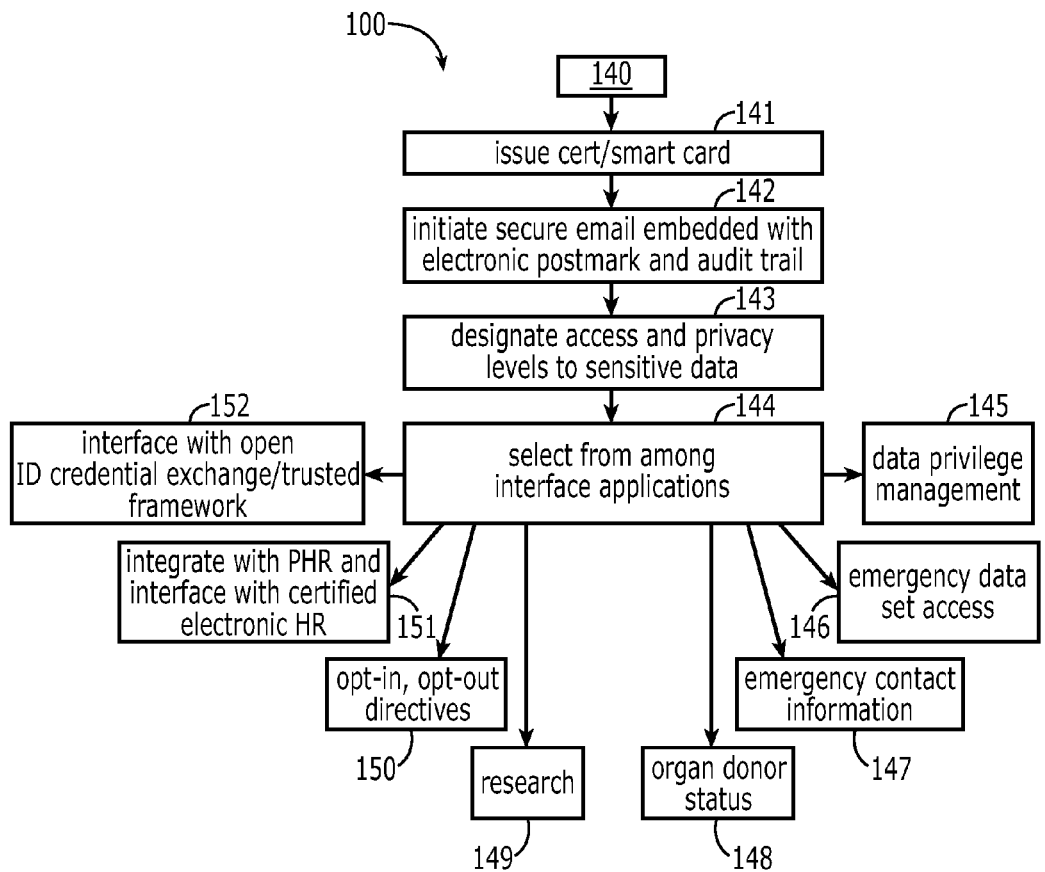

A description of the preferred embodiments will now be presented with reference to FIGS. 1A-10.

An initial part of a process 100 for providing access to emergency healthcare data is directed to an enrollment process for the participant. The steps in this process 100 are outlined in the flowcharts of FIGS. 1-2C, with FIG. 1 comprising a high-level view and FIGS. 2A-2C, a more detailed view. Identity proofing is an important feature of the invention, which can have a plurality of levels depending upon the degree of assurance level desired. All levels preferably include validation of address and zip code (USPS).

A Level 1 assurance can comprise validation of a user name, with a possibly weak password being used. Level 2 can be attained with the use of a strong password and possibly a question or image definition. Assurance Level 3 requires a majority of the steps to be discussed in the following. The highest assurance level would require all steps noted plus an FBI background check. Flexibility and adaptability to different situations is provided by an entity's being able to select a subset of the steps of the process 100 to achieve a desired level of assurance or to achieve a desired grade level for a given class of employee or executive, for example. Therefore, the invention is not intended to be limited to the totality of the steps presented herein.

An exemplary multi-step identity verification and enrollment process 100 can include a preprocessing sector (block 101), which includes a user acknowledging receipt of a privacy statement acknowledgement (block 102).

The sponsor (block 103) can have, if desired, a customized front end web application for each client (block 104). Such a personalized web ID portal can include attributes by class, such as emergency data/directives; financial/educational; healthcare/Rx/trials; social clubs/associations; business/professional; family/e-coupons; personal/private/governmental; and mobile device registrations. One possible way of segregating the attributes is by presenting a plurality of, such as 20, pictures, from which the user selects and names one, and provides a hint word or phrase. This selection can be tested and accepted. When the next category is selected, the plurality of pictures, minus the previously selected one, is presented from which to choose.

The client can comprise, for example, an agency, association, corporation, organization, club, society, company, community, group, etc. The client may or may not provide a verifiable database of qualified persons as an initial match list used to control initial access and participant correlation.

Three general classifications of clients can comprise, but are not intended to be limited to, a consumer for family enrollment, which typically will not be vetted; a company desiring only basic demographic verification, which could use a third-party site, their human resources department, a patient list, or an employee list, which typically will not be vetted; and a company that desires a fully vetted process, requiring a personal identifiable verification (PIV) card and corporate verification.

The substantive part of the process 100 begins with entry of demographic data (block 105), which can include entering an email address and a selected password (for verification re-entry; block 106). All required personal data are also entered (block 107), which can include, but are not intended to be limited to, such as name, address, citizenship, social security number, etc.

A verification request screen provides the ability to perform further validation against sponsor supplied list (block 108). Acceptance may be recognized by elements such as a government-issued ID; drivers license, Medicaid, Medicare or Food Stamp card, a PIV card, or a passport with a magnetic stripe that can be swiped in a reader and electronically present a matching name. In addition, or in lieu of this, an employer, membership club or organization that issues magnetic stripe card can be used as a secondary validating sauce.

The verification process begins by verifying the user's name to his/her address (block 109), which can comprise a third-party verification of the entered street, and then verification of the user's name to the street. This step 109 can be performed, for example, by the U.S. Postal Service (USPS), although this is not intended as a limitation. The USPS will verify whether the user has been at their current address for less than or greater than six months.

The user's entered address is also verified against the entered telephone number (block 110). If desired, an additional set of steps can comprise validating the user's telephone number with their carrier, and, if the telephone number has been active for less than 6 months, the number can be validated to an address, with the verification of the carrier. The process will verify if the user is using his/her legal name or a nickname.

Next the user's name is verified against the date of birth and gender along with the last four digits of the social security number (SSN; block 111), which will typically comprise a third-party verification.

The legal name of the user and his/her standing is also verified with a valid debit or credit card via a third party, such as a national financial institution (block 112). This will typically not entail a transaction, but rather the return of just a yes or no response of good standing.

Depending upon the assurance level requested, a positive acknowledgment from steps 108-112 must be met to a minimum value (block 113). Otherwise, the process is placed on hold for a predetermined period, for example, for up to 45 days (block 114). In this case, a letter and form are electronically sent to the user (block 115), who is asked to return the letter with postage and routing data (block 116). The carrier, for example, the USPS, tracks the letter for possible fraud (block 117), thereby providing third-party verification.

The returned form letter will typically be required to be notarized, the credit/debit card verified, and mailed back to a designated address (block 118). When internally received, the form is date stamped and recorded. A message, such as an email, can be sent to the user, providing a personal access code to reactivate the application (block 119). The hold is then released "manually" (block 120) and the process 100 continues from block 124, joining those who had achieved the minimum score at block 113.

If the minimum score was achieved at block 113, three consumer-based questions are presented (block 121), such as, for example, third-party-providing knowledge-based questions. Depending upon the number of correct answers (block 122), the process 100 proceeds as follows.

If all three questions are answered correctly, the process continues at block 124. If only two questions are answered correctly, a fourth consumer-based question is posed (block 123), and, if this is answered correctly, the process proceeds to block 124. If either the fourth question is answered incorrectly, or only one of the three initial questions are answered correctly, the process 100 returns to block 114, wherein the process 100 is put on hold.

The process 100 for those who have satisfied the above conditions by presenting a plurality, for example, ten question options for self-selection and self-answer (block 124). The user's choices are captured and maintained.

Another aspect of the process 100 can include the verification of licensing information (block 125), such as those that the user may have acquired through training, schooling, and/or certification credits that can be issued nationally or in some other verifiable manner. Such licenses can include, but are not intended to be limited to, licenses to practice medicine, carry a fire arm, perform law enforcement duties, perform financial auditing services, carry out a professional trade, etc. These credentials can be validated, for example, via a recognized third-party credentialing service, and preferably will include an expiration date and certificate number.

A further aspect of the process 100 includes the placement of a telephone call for voice print and verification, which can comprise an out-of-bound third-party process (block 126). If there is no answer, the call can be repeated a predetermined number of times, for example, once. Preferably the user will have provided the telephone number to be used while the user is at a computer screen.

If the call is answered, the user is asked if the call was expected (block 127), in which case the user is asked to depress a telephone key, for example, the "#" symbol, to activate the telephone call part of the process. If the symbol is not pressed in a predetermined amount of time (block 128), the process ends, with a predetermined number, for example, one, repeat call, to be verified, allowable to the same telephone number. If the call is dropped (block 129), the process ends, and the user is requested to call the host, via, for example, a help desk.

If the call proceeds properly, the system repeats the user's name and confirms the entered data, and records the user's acknowledgement, which is time and date stamped (block 130). Again, if there is no response, the process 100 ends. The user is asked to read and repeat the telephone number, in order to record a voice bio-metric (block 131). Then the user is asked to confirm that they provided the requested data by selecting a button (block 132). Again, if there is no response, the process 100 ends.

The process 100 continues by collecting the user's fingerprint information with the use of a third-party vendor, for example (block 133). The process 100 also includes the capture of the user's photograph and/or other type of image having a named definition (block 134). This could be provided, for example, by a third-party vendor.

The process 100 then proceeds by assigning, for example, in .pdf format, a random "bingo card" to the user. The bingo card can be printed and transmitted to the user, for example, by a third-party vendor (block 135). As an example, a card having bar code functionality and RFID could be employed that interfaces with preapproved authorized forms for consent management and privilege granting.

The user is prompted to devise a strong password for user authentication (block 136).

Next an internal unique identity number is generated and assigned (block 137) and also a separate and distinct unique, external enterprise patient/consumer ID controlled index number is generated (block 138). The external ID allows the consumer to manage and control privacy preferences, the sharing of restricted content such as protected health information, such as directives and emergency contact data. The external and internal IDs are not commingled, and are stored separately.

A unique email extension and address are generated (block 139) that function separately, for identity protection, and are separate and distinct from the current "user name," which is the email address used in the identity proofing process. This process can use an electronic post mark for emergency care patient tracking, incorporating the HITSP standard and using CCR and CCD packets and record-tracking functions and for securely sharing and tracking data.

If desired, the user can identify and register dependants (block 140), such as minors, dependent seniors, or disabled persons under his/her full-time responsibility and direct care and who might, in an untimely accident, need to be identified and the care of whom would require access to their emergency data.

Once the user's identity has been validated via the foregoing steps, a digital certificate can be issued, for example, by a Certification Authority (block 141). Roaming certificates for cell phones can be server-side based, and digital certificates can be integrated into smart ID cards in compliance with national NIST standards.

To complete the substantive validation and registration process, a secure email function is initiated that is embedded with an electronic postmark and audit trail for secure data exchange (block 142). The trusted process validates the user's ID and provides an authentication process with a digital signature function and an audit for non-repudiation. The process, which is preferably encrypted, focuses on access controls and privilege management using electronic marks integrated into each secure communication. This can apply, for example, to emergency data, a clinical trial, a financial transaction, secure document sharing, medical power of attorney, medical directives such as a "do not resuscitate" order (DNR), or a legal document exchange.

The user is permitted to designate levels of privacy and access to sensitive data, preferably in customized fashion (block 143). The user is asked to select a combination from among elements such as username and strong password plus one or more of the bingo card, a biometric ID, knowledge-based questions, the user's image, and digital signature, although these are not intended as limitations.

The user can also select from among at least the following interface applications (block 144) including: user preference relating to data privilege management (block 145), emergency data set access (block 146), emergency contact information (block 147), organ donor status (block 148), research (block 149), and opt-in and opt-out directives (block 150). The data can be integrated with a certified personal health record and interface with a certified electronic health record (block 151), if desired and available. The data can also interface with an open ID credential exchange/trusted framework (block 152).

Figure 3A:
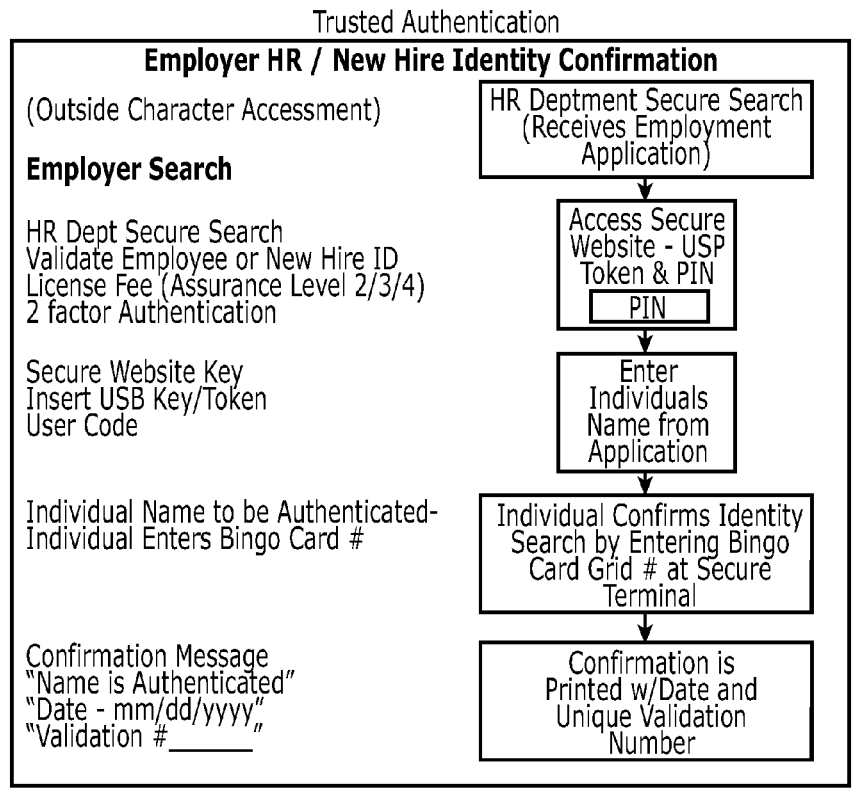
FIGS. 3A-3C are flowcharts for trusted authentication, including employer/new hire identity confirmation (FIG. 3A); hospital search/emergency department (FIG. 3B); and registered first/volunteer responders (FIG. 3C).
Figure 3B:
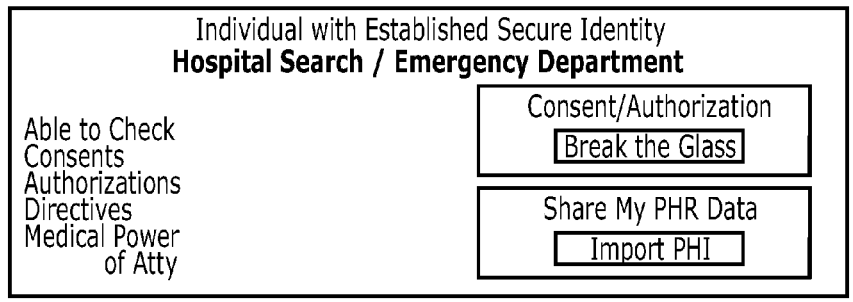
Figure 3C:

FIGS. 3A-3C indicate the three types of trusted authentication: employer/new hire identity confirmation (FIG. 3A); hospital search/emergency department (FIG. 3B); and registered first/volunteer responders (FIG. 3C).

Figure 4:
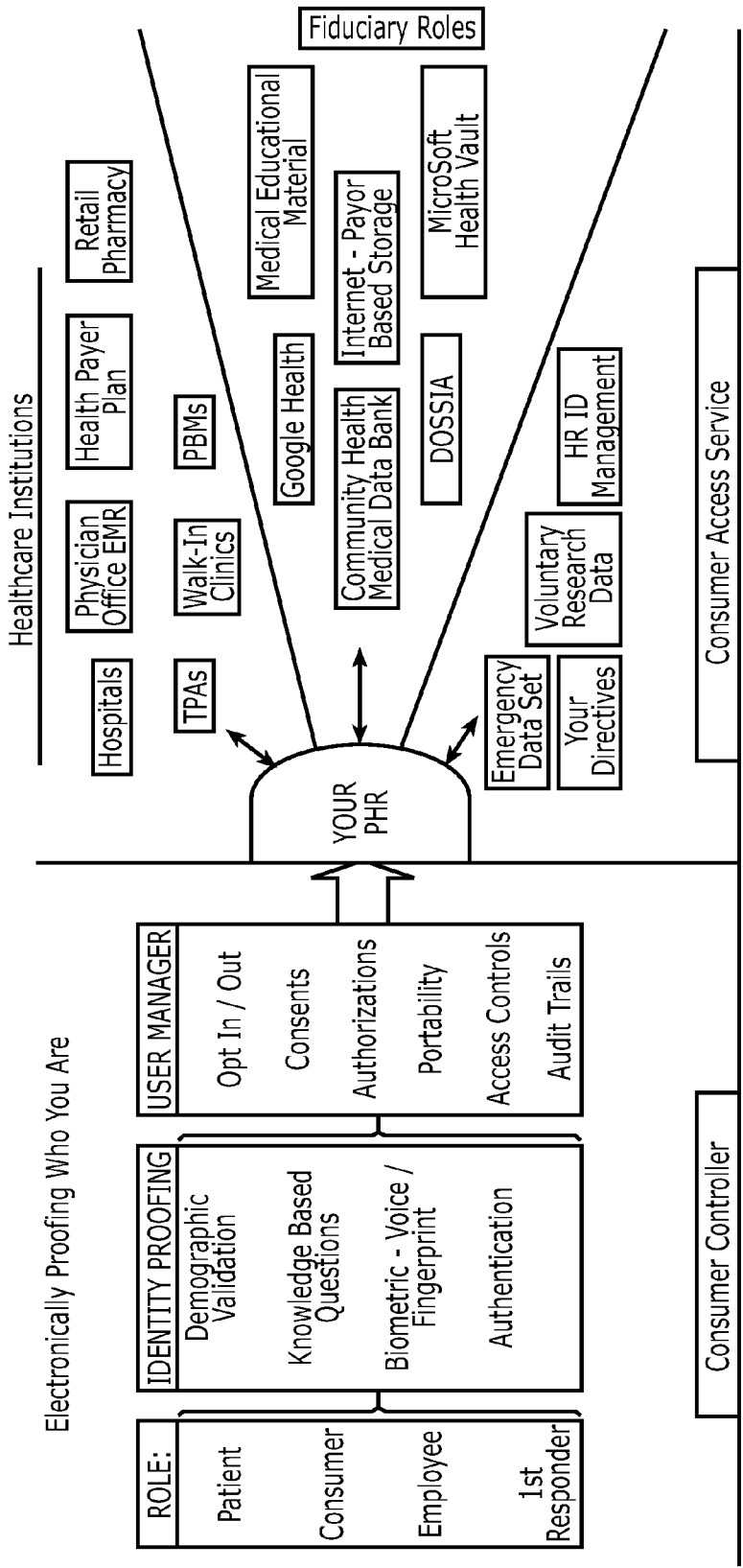
FIG. 4 is a flowchart of role-based identity proofing and the interaction of an emergency medical dataset, a subset of a personal health record, with a healthcare institution.

FIG. 4 is a flowchart of role-based identity proofing and the interaction of a personal health record (PHR) with a healthcare institution. Data flow that is controlled by the consumer (left-hand side) is shown as contributing to the participant's PHR, which informs the consumer access service of the network.

Figure 5:
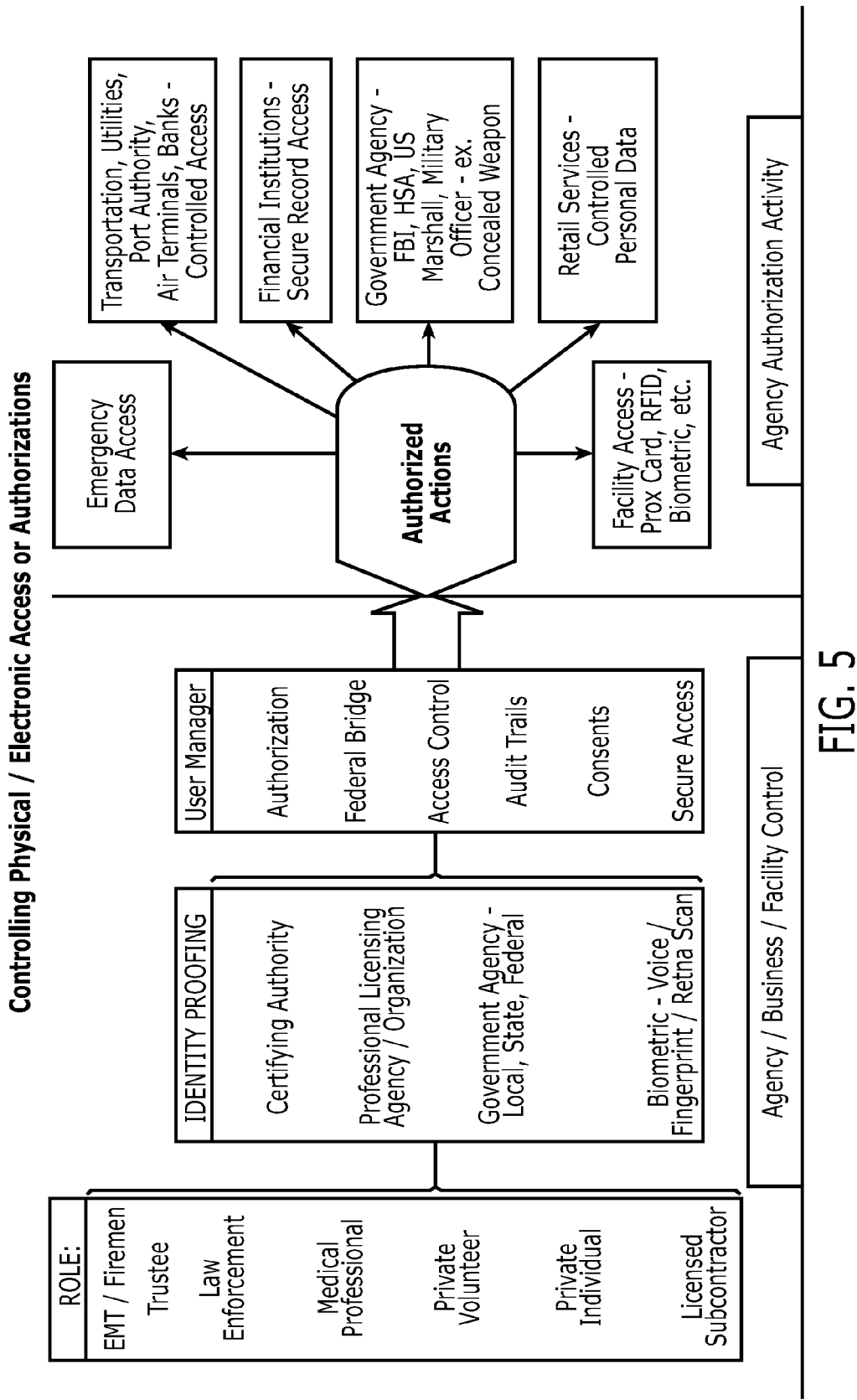
FIG. 5 is a flowchart for controlling physical/electronic access or authorizations.
Figure 7:
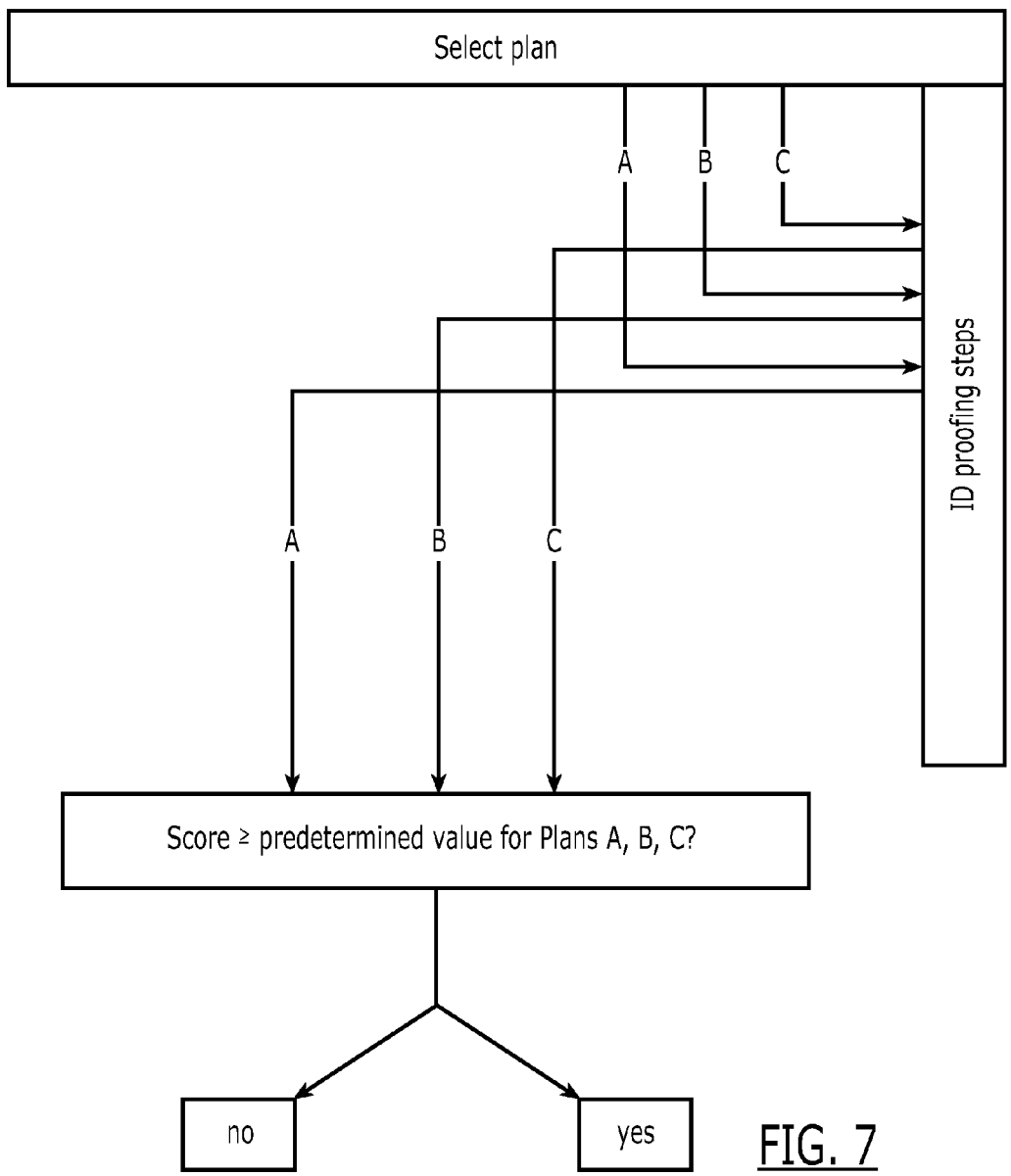
FIG. 7 comprises a matrix for plan selection based upon level of authentication desired.

FIG. 5 is a flowchart for controlling physical/electronic access or authorizations. Here are shown the different roles of the participants, leading to their respective authorized actions and access.

In use, upon the occurrence of an accident, for example, typically the police are the first to arrive and notify emergency medical services. An ambulance can be dispatched, and the police attempt to identify an unconscious/unresponsive victim. This can be attempted using the motor vehicle registration records, such as VIN#, Tag#, or DL #. The vehicle identification number is used to query a federated emergency contact registry (for example, NLETS), to obtain the vehicle owner emergency contact name(s) and telephone number(s). These data are passed to the emergency responders, who can search systems for possible historic patient data.

In a particular embodiment, the VIN# registry can comprise a stand-alone system that interfaces with a state's driver's registry and interface with NLETS. An individual who registers his/her VIN# can voluntarily elect an "alert function," enabling a law enforcement office to be alerted via, for example, a red flag, that emergency medical data are available and can alert an EMT. The user can also create an emergency medical data set and elect not to have a flag posted.

The emergency medical data can comprise a subset of a personal health record (PHR). These data should preferably be stored on a separate secure registry, which can only be accessed by a licensed emergency professional (e.g., EMT, nurse, fire EMT, physician, ER staff, and trauma center personnel). An identifying and permission-granting data viewing privilege technology such as a voluntary universal health ID (VUHID) can be incorporated. As illustrated in FIG. 3C, a separate registry can be provided for licensed emergency medical professionals.

If the victim's identity is established, a membership in the network is ascertained, in which case an emergency dataset is provided to the healthcare worker. The patient can then be treated at the scene and in the hospital in a more informed manner. The NLETS data are also used to make contact with those listed in the emergency contact registry.

Consent documents can also be included in the system, such as, but not intended to be limited to, VIN# ECON/driver's license ECON, emergency medical dataset, "break the glass" consent/authorization, organ donation data, and DNR data.

To validate the user's demographic information at a future date, once a user is fully vetted and authenticated, a unique email address is generated that will incorporate the alpha text of their email address to the left of "@" followed by a forward slash (/) mark, at which time their validated address will be inserted excluding state and including zip code immediately followed by @. After the "@" mark will be "USPS.GOV>" (sample: jkragh/1024orangeaveorlando32802@usps.gov). At a future date both this email (address inserted) can be sent to the USPS to validate its authenticity accompanied with an attachment of a new address of the user if such applies. This process is for authenticating and revalidating an authenticated ID or "elink authentication."

In summary, the system and methods of the present invention permit the establishment of a trusted process for interoperable identity management in a distributed healthcare enterprise. The system and methods provide ID proofing, vetting, and leveraging vetted authenticated cards/tokens usable in a distributed interoperable knowledge healthcare environment.

The key principles include ID proofing, generating new identity reference/tokens, or recognizing and accepting existing ones to provide contacts and directives. A trusted process is included for generating an enhanced token with acceptable attributes. Real-time authentication or verification of identity are coupled with privileges and role-based access control with attributes are provided, as well as "rules-of-the-road" and "best practices" as applicable across multiple trusted domains, medical professional, and healthcare user communities to address medical emergencies and disasters. Communities and organizations define their own policies, rules, privileges, and criteria, which can be distributed. HIPAA, state, and stimulus guidelines are followed, offering a common foundation for recognizing authenticated identities in a variety of public and private healthcare settings across the national landscape, and even internationally.

Clear definitions of trusted "rules of the road" are provided for adoption in healthcare, and the ability to apply the rules consistently within local, enterprise, and federated architectures. This provides a cross-cutting functionality, which addresses the typically inconsistent methodologies inherent in current healthcare facilities. A foundation for privilege and attribute management is provided, which can include an expanded reach with business associate agreements, certified personal health records, and certified electronic medical records.

Further, consistent implementation is balanced with potential cost/risks. The system and methods have appropriate levels of trust/assurance, with both identity and assigned attributes. A common foundation is also provided for education and promotion, and a cost-effective process for a more common risk-management framework.

An exemplary privacy class matrix is depicted in FIG. 6, illustrating elections that can be made by the user regarding privacy levels (to share all data, restrict data sharing, share with restricted access, no sharing of data, and emergency-only sharing of data). Any number of classes can be devised for each of these privacy levels, so that a user can select a privacy level over a multitude of domains, such as a disease state.

Recognizing that not one size fits all in proving one's identity, an organization or individual will have a choice in selecting the strength and integrity of the ID proofing plan they will go through, as discussed above. Following the NIST guidelines, one can select a strong authenticated ID (FIG. 7) Plan A that requires more steps in the ID proofing process and represents a higher level of "trust" than if one elects Plan B, which represents a less rigorous level of identity proofing, resulting in a moderate level of authenticated trust and therefore requiring a fewer number of steps as in Plan A. If a lower level of a trusted ID is desired (below Plan B) and only a few steps in the identity proofing process are needed, then Plan C would be utilized. A group or an organization may also elect to have a customized program of steps that must be used to achieve a passing score to achieve a desired authentication level.

Typically, each plan will have a scoring process associated with it in order to achieve a plan-designated authentication scoring level. An individual will know steps in advance that will assist in helping one achieve a designated score that can be independently validated and audited. The resulting score of an identity-proofing process then results in a pass or no-pass score.

Figure 9:
FIG. 9 is a portion of the data set of FIG. 8, with the emergency medical data set hidden from view.

FIG. 8 is an exemplary emergency medical data set layout of the present invention digitally signed by someone with access to the entire record. FIG. 9 (for law enforcement) is a portion of the data set of FIG. 8, with the emergency medical data set hidden from view and thus representing emergency contact information.

Figure 10:
FIG. 10 is an exemplary screen shot of an exemplary portal for accessing data in a user's personal health record.

FIG. 10 is an exemplary screen shot of an exemplary portal for accessing data via a user's personal health record.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A computerized method for identity verification and validation of a user for enrollment of the user in a secure personal dataset accessing system, the computerized method comprising:
    electronically receiving a personal dataset including identifiable attributes of a user into a computer;
    using the computer, electronically verifying the identifiable attributes with at least two trust authorities, wherein the verifying includes determining authenticity of an asserted identity of the user including the identifiable attributes;
    electronically forming and verifying the personal dataset including demographic data, a social security number, geographic data and knowledge information into the computer;
    automatically capturing at least one biometric identifier of the user on the computer for validating the identifiable attributes of the user, wherein the validating includes confirming an asserted identity matches the identifiable attributes, wherein the identifiable attributes consist of at least one of an image and a demographic, and wherein an e-audit trail is provided having a traceable electronic enterprise infrastructure and bench mark performance indicator;
    generating a digital security element as a result of the verifying and validating steps, the digital security element having a plurality of randomly generated indicia thereon;
    electronically receiving a user selection of a strong password into the computer;
    automatically assigning one digital identification number, a unique email extension and an electronic address to the user using the computer; and
    transmitting the digital security element to the user from the computer, the digital security element enabled for granting electronic access to the personal dataset relating to the user, the personal dataset having been authenticated through the verifying and validating steps.

2. The method recited in claim 1, wherein the personal dataset comprises a designated address and the verifying comprises accessing a database of a postal service and determining a length of time during which the designated address has been valid.

3. The method recited in claim 1, wherein the personal dataset comprises a personal telephone number, and the verifying comprises electronically determining that the personal telephone number is associated with a designated address through a carrier of the personal telephone number.

4. The method recited in claim 1, wherein the personal dataset comprises a user date of birth, a gender, and at least a portion of a user social security number, and the electronic verification comprises transmitting the date of birth, the gender, and the at least a portion of the user social security number to a third-party verification system for validation.

5. The method recited in claim 1, wherein the personal dataset comprises a credit card or debit card number, and the electronic verification comprises electronically validating the card number with a financial institution and a mailing address.

6. The method recited in claim 1, wherein the personal dataset comprises user licensing information, and the electronic verification comprises transmitting the user licensing information to a credentialing service for validation.

7. The method recited in claim 1, wherein the at least one biometric identifier comprises at least one of a fingerprint, a signature, and a voice print of the user.

8. The method recited in claim 1, further comprising:
    electronically selecting from the personal dataset a subset thereof comprising an emergency medical dataset;
    storing a copy of the selected emergency medical dataset separately from the personal dataset; and
    providing an indicator available to emergency medical personnel that as the emergency medical dataset is available for access by the emergency medical personnel.

9. The method recited in claim 8, wherein the indicator is available via a second emergency contact registry system separate from the computer.

10. The method recited in claim 2, wherein the personal dataset comprises the designated address, and following the digital security element transmission, transmitting a unique email address for subsequent revalidation with the postal service.

11. The method recited in claim 1, further comprising automatically placing a telephone call to the user from the computer for verifying a telephone number provided by the user as part of the personal dataset.

12. The method recited in claim 1, further comprising electronically receiving a user selection of access privileges into the computer to at least a portion of the personal dataset for at least one person other than the user.

* * * * *